March 8, 1932.  M. D. KLISE  1,848,955
DRAWBAR
Filed June 9, 1930   2 Sheets-Sheet 2
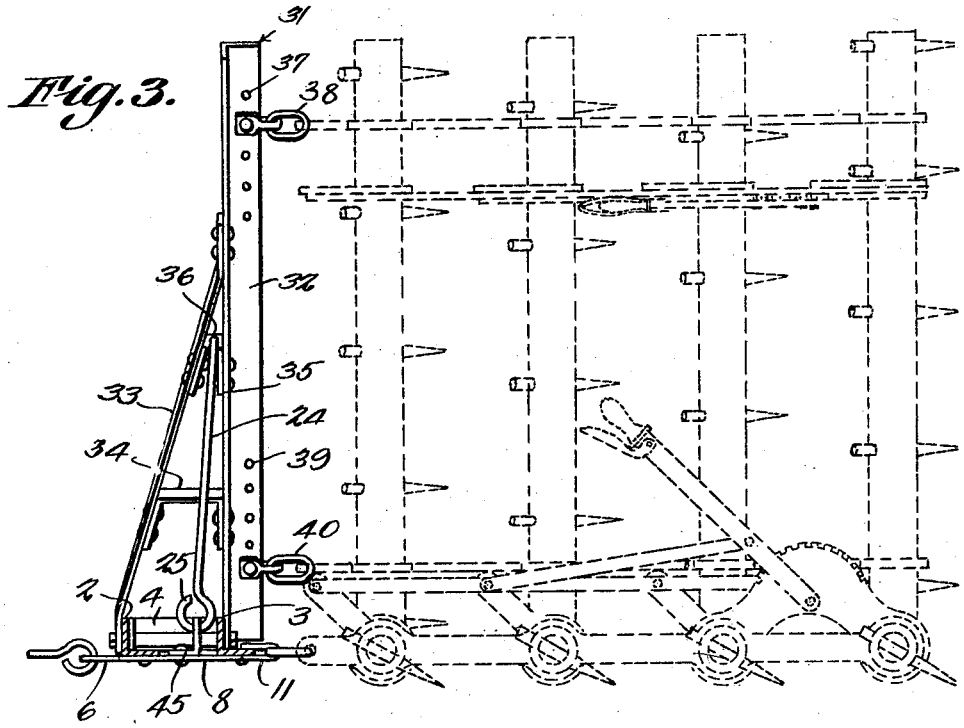
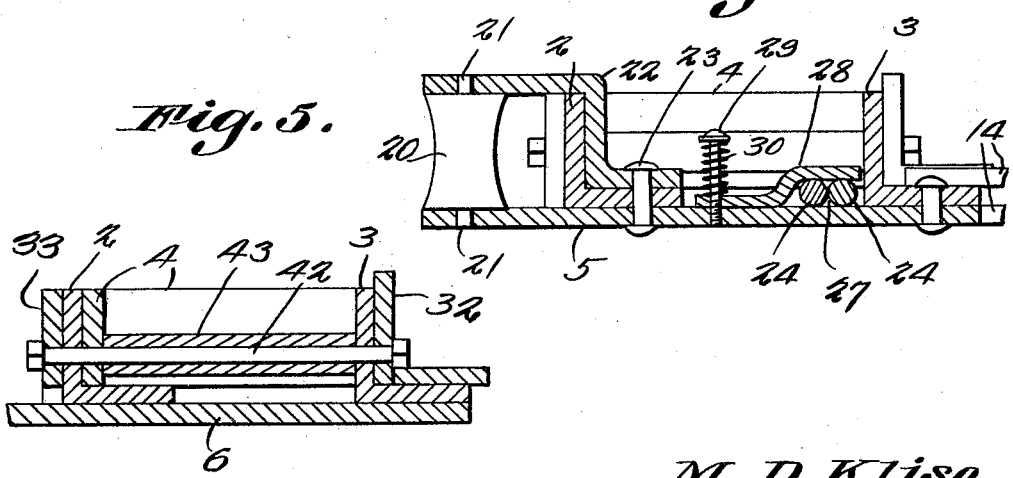
M. D. Klise
Inventor
By C. A. Snow & Co.
Attorneys Patented Mar. 8, 1932

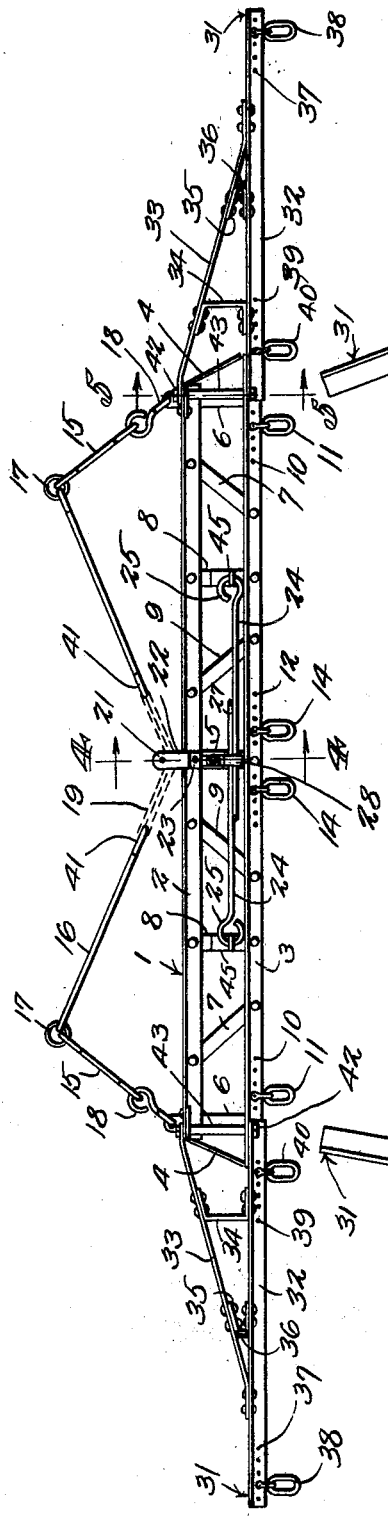

1,848,955

UNITED STATES PATENT OFFICE

MARION D. KLISE, OF MARSHALLTOWN, IOWA, ASSIGNOR TO THE LIGHT DRAFT HARROW COMPANY, OF MARSHALLTOWN, IOWA

DRAWBAR

Application filed June 9, 1930. Serial No. 459,994.

On account of the light draft, wide-spreading features of the peg-tooth harrow, it has been a problem to move agricultural instruments of that kind between fields or places of operation quickly and easily. Many farmers spend much time and labor in the busy season of the year, tearing down harrows, loading them upon wagons, or other transporting devices, and taking similar time-consuming steps, merely for the purpose of moving the harrows from one field to another.

In view of the foregoing, the present invention aims to provide a means whereby a harrow may be moved easily and quickly from one field to another, even though the harrow may be of large size and even though the harrow may have to be taken through gates which are narrower than the harrow when the harrow is extended to full width.

The invention aims to provide means for transporting a harrow without uncoupling the harrow from a tractor or dropping a tug.

Another object of the invention is to provide a draw bar for a harrow which will not rot, warp, split, or sag, the result being that the draw bar will give satisfactory service for years, without expert attention, and without loss of time, or expense for repairs.

It is within the province of the disclosure to improve generally and to enhance the utility of devices of that type to which the present invention appertains.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 1 shows in top plan, a draw bar constructed in accordance with the invention, the same being extended;

Figure 2 is an elevation showing the draw bar with the end portions folded upwardly and inwardly;

Figure 3 is a sectional view showing the device folded;

Figure 4 is a section on the line 4—4 of Figure 1;

Figure 5 is a section on the line 5—5 of Figure 1.

The draw bar forming the subject matter of this application preferably is made of metal throughout. It comprises a main frame 1 which is a composite structure, the main frame embodying a front bar 2 and a rear bar 3, shown in the form of angle members. Outwardly inclined deflector strips 4 extend between the ends of the front bar 2 and the ends of the bar 3, as shown in Figure 4, the rear bar 3 being slightly longer than the front bar 2. The main frame 1 includes a first or middle cross piece 5 connecting the horizontal flange of the front bar 2 with the horizontal flange of the rear bar 3. The said flanges of the bars 2 and 3 are connected at their ends by end braces 6 disposed at right angles to the bars 2 and 3, the end braces 6 projecting forwardly with respect to the front bar 2, as shown in Figures 1 and 5 of the drawings. The horizontal flanges of the bars 2 and 3 of the main frame 1 are connected by intermediate braces 7, 8 and 9, the braces 7, and 9 being inclined in opposite directions, as shown in Figure 1, the braces 8 being arranged at right angles to the bars 2 and 3, the bars 2 and 3 being parallel.

The horizontal flange of the rear bar 3 is provided near to its ends with openings 10 in which clevis connections 11 may be mounted for adjustment longitudinally of the rear bar 3. Near to its central portion, the horizontal flange of the rear bar 3 is provided with openings 12, in which clevis connections 14 may be mounted for adjustment longitudinally of the bar 3.

A draft hitch is provided, and may be of any desired construction. As shown, the draft hitch is made up of rigid outer links 15 and rigid inner links 16, disposed at an angle to the links 15, as Figure 1 will show. The inner ends of the links 15 and 16 are pivotally connected in any suitable way, for instance, by means of rings 17, to which the means (not shown) for pulling the draw bar along may be attached. Hooks 18 or equivalent devices effect a pivotal connection between the rear end of the outer link 15 and the forward end of one of the end braces 6 on the main frame 1. The inner ends of the links 16 have eyes 41 connected by a flexible element 19, such as a chain.

The chain 19 slides behind an anti-friction element, such as a roller 20, journaled at 21 in the forward end of the middle cross piece 5, and in an angle bracket 22 which extends across the upper edge of the vertical flange of the front bar 2, downwardly along that flange, and horizontally along the horizontal flange of the bar 2, as shown in Figure 4. A securing element 23 unites the rear end of the bracket 22 and the horizontal flange of the front bar 2, as shown in Figure 5.

Braces 24, in the form of rigid rods, are provided, and at their ends, the braces 24 are pivotally connected by means of eyes 25 with angle members 45 mounted on the braces 8. The braces or props 24 are supplied at their free ends with hooks 26 or equivalent coupling means. When the props 24 are not in use, their inner ends are overlapped as shown at 27 and are supported on the middle cross piece 5, between the front bar 2 and the rear bar 3. The overlapped ends 27 of the props 24 are held in place by an offset retainer 28 having vertical sliding movement on a headed stud 29 (Figure 4) carried by the middle cross piece 5. A compression spring 30 surrounds the stud 29. One end of the spring 30 abuts against the head of the stud 29 and the other end of the spring bears on the retainer 28 to hold the retainer on the props 24, the props 24 being held in the inoperative position disclosed in Figure 1 of the drawings.

The draw bar comprises end sections 31. The end sections 31 include angle bars 32 and arms 33 disposed at an acute angle to the bars 32, as shown in Figure 1, the outer ends of the arms 32 being joined to the vertical flanges in the bars 32. The arms 33 and the vertical flanges of the bars 32 are connected by inner braces 34 and outer braces 35. Keepers 36 are secured to the outer braces 35.

Near to their outer ends, the horizontal flanges of the bars 32 of the end sections 31 have openings 37 in which clevis connections 38 may be mounted for adjustment longitudinally of the bars 32. Near to their inner ends, the horizontal flanges of the bars 32 are supplied with openings 39, in which clevis connections 40 are mounted for adjustment longitudinally of the bars 32.

The inner ends of the arms 33 of the end sections 31 are overlapped on the vertical flanges of the front bar 2. The parts 32 of the end sections 31 are overlapped on the rear bar 3 of the main frame 1. Pivot elements 42, such as bolts are threaded through the vertical flanges of the angle bars 32, through the vertical flanges of the rear bar 3 of the main frame, through the ends of the deflector strips 4, through the vertical flange of the front bar 2, and through the arms 33 of the end sections. The end sections 31, thus, are pivotally mounted on the ends of the main frame 1, so that the end sections 32 can be swung upwardly into the position of Figure 2. Tubular spacers 43 surround the pivot bolts 42 and are interposed between the ends of the members 4 and the vertical flanges of the rear bars 3 of the main frame 1, as shown in Figures 1 and 4, the spacers 43 obviously adding strength to the structure at the places where the end sections 31 are pivotally connected with the ends of the main frame 1.

In practical operation, the end sections 31 are disposed in the same general horizontal plane with the main frame 1, whilst the dragging operation is going on. The central part of the drag is connected to the elements 11 and 14 of the main frame 1, and the wings of the drag are connected to the members 38 and 40 of the end sections 31. When it is desired to transport the drag, the end sections 31 of the draw bar can be swung upwardly into overhanging relation with respect to the main frame 1, as shown in Figure 2. The props 24 are disengaged from beneath the retainer 28 of Figure 4, and the hooks 26 on the outer ends of the props are engaged with the keepers 36 on the end sections 31, to hold the end sections 31 and the wings of the drag up, as disclosed in Figure 3. By inclining the teeth on the body of the drag rearwardly, the drag may be transported readily, the wings of the drag being upwardly extended and it being possible to draw the drag through gates, over roads, and in other places where it would not be possible to carry the drag readily in the absence of the device forming the subject matter of this application.

The construction is such that it is unnecessary to take the drag apart, load it upon a wagon, or perform other time-consuming operations when it is desired to move the drag from one field to another.

Although a two-point hitch has been shown at 17 in Figure 1, it will be understood that the draw bar may be operated with a different form of hitch, and, moreover, the specific hitch alluded to may be employed in connection with a different sort of draw bar.

By way of recapitulation, it may be stated that the device forming the subject matter of this application embodies a draw bar comprising a main frame 1, open-work end sections 31 being hinged or pivoted to the ends of the main frame for folding upwardly in a substantially vertical plane, into an inoperative, upstanding position with respect to the main frame, the end sections 31 being foldable downwardly and outwardly into approximately the same plane with the main frame 1. The props 24 are pivoted to the main frame 1, and the hooks 26 and the keepers 36 constitute interengaging elements on the props and on the end sections 31 whereby the props will form a releasable, positive connection between the end sections 31 and the main frame 1, the props holding the end sections in upstanding position with respect to the main frame. The props 24 are of such length that they can be folded into overlapped, in operative position on the main frame 1, and the retainer 28 on the main frame cooperates with the props, and forms means for holding the props folded on the main frame, and in inoperative position, as aforesaid. The points 36 of connection between the props 24 and the end sections 31 are sufficiently remote from the inner ends of the end sections 31 (meaning by "inner ends" the places where the bolts 42 are located in the present embodiment of the invention), so that the props 24 will have no appreciable fulcrum effect, and will not throw a strain on the inner, pivoted ends 42 of the end sections 31. The rearwardly and outwardly inclined deflectors 4, which are connected to the ends of the main frame 1, are exposed for use, when the end sections 31 are folded upwardly, but the deflectors are housed within the contour of the end sections, when the end sections are folded downwardly into an approximately horizontal position. When the end sections 31 are folded upwardly, the deflectors 4 keep the ends of the main frame 1 from catching on gate posts or other obstacles, whilst the device is being drawn from place to place, and the deflectors prevent dirt and stones from working into the main frame 1 at its ends, so that the device, during transportation, is not dragging along a collected load; and ease of transportation is a prime consideration in the present implement, as pointed out in the opening paragraphs of this specification.

Having thus described the invention, what is claimed is:—

1. In a device of the class described, a draw bar comprising a main frame, end sections pivoted to the ends of the main frame, and foldable into upstanding position with respect to the main frame, and pivoted props forming a releasable, positive, connection between the end sections and the main frame, the props constituting means for holding the end sections in upstanding position with respect to the main frame, the points of connection between the props and the end sections being sufficiently remote from the inner ends of the end sections so that the props will have no appreciable fulcrum effect and will not throw a strain on the inner, pivoted ends of the end sections.

2. In a device of the class described, a draw bar comprising a main frame, end sections pivoted to the ends of the main frame, and foldable into upstanding position with respect to the main frame, props pivoted to the main frame, the props and the end sections having interengaging elements whereby the props will hold the end sections in upstanding position with respect to the main frame, and means for holding the props folded on the main frame and in inoperative position.

3. In a device of the class described, a draw bar comprising a main frame, end sections hinged to the ends of the main frame and foldable into upstanding position with respect to the main frame, props pivoted to the main frame, the props and the end sections having interengaging elements whereby the props will constitute means for holding the end sections in upstanding position with respect to the main frame, the props being of such length that they can be folded into overlapped, inoperative position on the main frame, and a retainer on the main frame and cooperating with the props to hold them on the main frame, as aforesaid.

4. In a device of the class described, a main frame, open-work end sections pivoted to the ends of the main frame for folding upwardly in a substantially vertical plane, into an inoperative position, and foldable downwardly and outwardly into approximately the same plane with the main frame, and rearwardly and outwardly inclined deflectors connected to the ends of the main frame, the deflectors being exposed for use, when the end sections are folded upwardly, and being housed within the contour of the end sections, when the end sections are folded downwardly into an approximately horizontal position.

In testimony that I claim the foregoing as my own, I have hereto affixed my signature.

MARION D. KLISE.